United States Patent
Yamazaki et al.

(10) Patent No.: US 11,500,759 B2
(45) Date of Patent: Nov. 15, 2022

(54) INFORMATION PROCESSING SYSTEM, INFORMATION PROCESSING METHOD, AND DEVELOPMENT APPARATUS

(71) Applicant: NINTENDO CO., LTD., Kyoto (JP)

(72) Inventors: Takahiro Yamazaki, Kyoto (JP); Kiyoto Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 96 days.

(21) Appl. No.: 16/939,856

(22) Filed: Jul. 27, 2020

(65) Prior Publication Data

US 2021/0064511 A1   Mar. 4, 2021

(30) Foreign Application Priority Data

Aug. 30, 2019 (JP) ............................ JP2019-158338

(51) Int. Cl.
*H04L 9/32* (2006.01)
*G06F 11/36* (2006.01)
(Continued)

(52) U.S. Cl.
CPC .......... *G06F 11/3624* (2013.01); *A63F 13/73* (2014.09); *A63F 13/77* (2014.09); (Continued)

(58) Field of Classification Search
CPC ............ G06F 11/3624; G06F 11/3664; G06F 11/0787; G06F 11/3476; G06F 11/3612; (Continued)

(56) References Cited

U.S. PATENT DOCUMENTS 8,904,189 B1 * 12/2014 Ghose ................. H04L 9/3247 713/190
10,911,447 B2 * 2/2021 Coffey ............... G06F 11/0787
(Continued)

FOREIGN PATENT DOCUMENTS

| CA | 2 383 792 A1 | 10/2002 |
| JP | 2010-099211 A | 5/2010 |
| JP | 2016524730 A | 8/2016 |

OTHER PUBLICATIONS

Christian Dietrich et al., cHash: Detection of Redundant Compilations via AST Hashing, Jul. 12-14, 2017, [Retrieved on Jun. 6, 2022]. Retrieved from the internet: <URL: https://www.usenix.org/system/files/conference/atc17/atc17-dietrich.pdf> 13 Pages (527-538) (Year: 2017).*

Michel Chilowicz et al., Syntax tree fingerprinting for source code similarity detection, 2009 IEEE, [Retrieved on Jun. 6, 2022], Retrieved from the internet: <URL: https://ieeexplore.IEEE.org/stamp/stamp.jsp?tp=&arnumber=5090050> 5 Pages (243-247) (Year: 2009).*

(Continued)

*Primary Examiner* — Anibal Rivera
(74) *Attorney, Agent, or Firm* — Scully, Scott, Murphy & Presser, P.C.

(57) ABSTRACT

An information processing system is provided. The information processing system generates a program so as to output a hash value calculated based on a hash value calculation instruction included in a source code for generating the program, determines a set of analysis support information associated with the hash value calculation instruction and the hash value calculated based on the hash value calculation instruction, stores the set of the analysis support information and the hash value, stores at least a part of one or more hash values output as a result of execution of the program, and outputs, by using at least the part of the stored hash value, the analysis support information that makes the set with the hash value.

12 Claims, 12 Drawing Sheets

(51) Int. Cl.
*G06F 11/14* (2006.01)
*A63F 13/73* (2014.01)
*A63F 13/77* (2014.01)
*G06F 11/07* (2006.01)
*G06F 11/34* (2006.01)

(52) U.S. Cl.
CPC ........ *G06F 11/3664* (2013.01); *H04L 9/3236* (2013.01); *H04L 9/3242* (2013.01); *G06F 11/0706* (2013.01); *G06F 11/0748* (2013.01); *G06F 11/0787* (2013.01); *G06F 11/3476* (2013.01); *G06F 11/3612* (2013.01); *G06F 11/3636* (2013.01); *G06F 11/3648* (2013.01); *G06F 11/3684* (2013.01)

(58) Field of Classification Search
CPC ............. G06F 11/3648; G06F 11/3636; G06F 11/3684; G06F 21/64; G06F 21/54; G06F 21/602; G06F 21/563; G06F 11/0706; G06F 11/0748; G06F 11/0778; G06F 11/362; G06F 11/3644; G06F 11/366; A63F 13/73; A63F 13/77; H04L 9/3242; H04L 9/3236
See application file for complete search history.

(56) References Cited

U.S. PATENT DOCUMENTS

| | | | |
|---|---|---|---|
| 2004/0015747 | A1 | 1/2004 | Dwyer |
| 2006/0080537 | A1* | 4/2006 | Yoshizaki .............. G06F 21/64 713/176 |
| 2011/0314346 | A1* | 12/2011 | Vas ...................... H04L 9/3242 714/49 |
| 2016/0059127 | A1 | 3/2016 | Perrin |
| 2019/0116178 | A1* | 4/2019 | Coffey ................ H04L 63/0876 |
| 2020/0334045 | A1* | 10/2020 | Chaiken ................ G06F 9/4411 |

OTHER PUBLICATIONS

"MD5", Wikipedia, May 15, 2014, retrieved from the Internet on Mar. 14, 2017, URL: https://en.wikipedia.org/w/index.php?title=MD5&oldid=608752161.

Zhang, J. et al., "CDebugger: A scalable parallel debugger with dynamic communication topology configuration", 2011 International Conference on Cloud and Service Computing, Dec. 11, 2011, pp. 228-234.

* cited by examiner

FIG.7

| HASH VALUE | ARBITRARY CHARACTER STRING | LINE NUMBER | SOURCE CODE FILE NAME | SOURCE CODE REVISION | DATE AND TIME OF UPDATE | ARBITRARY CONSTANT VALUE |
|---|---|---|---|---|---|---|
| 47D4B39FA31F7D04F0AFFDE | Open InputFile | 562 | App1Source.src | 1.53 | 2019/07/01 16:00:00 | varIN_File: "DataInput001.dat" |
| 7C968AD5E283EF46DED0249 | Close InputFile | 570 | App1Source.src | 1.53 | 2019/07/01 16:00:00 | varIN_File: "DataInput001.dat" |
| 1EE723CB21092F540E81D351 | Open OutputFile | 650 | App1Source.src | 1.53 | 2019/07/01 16:00:00 | varIN_File: "DataInput001.dat" |
| A1B0C98496EECA858C0C07F | Close OutputFile | 670 | App1Source.src | 1.53 | 2019/05/25 17:10:00 | varIN_File: "DataInput001.dat" |
| 6D7CF8BE2A962C609133E76E | Open InputFile | 250 | App2Source.src | 1.87 | ... | — |
| ... | ... | ... | ... | ... | ... | ... |

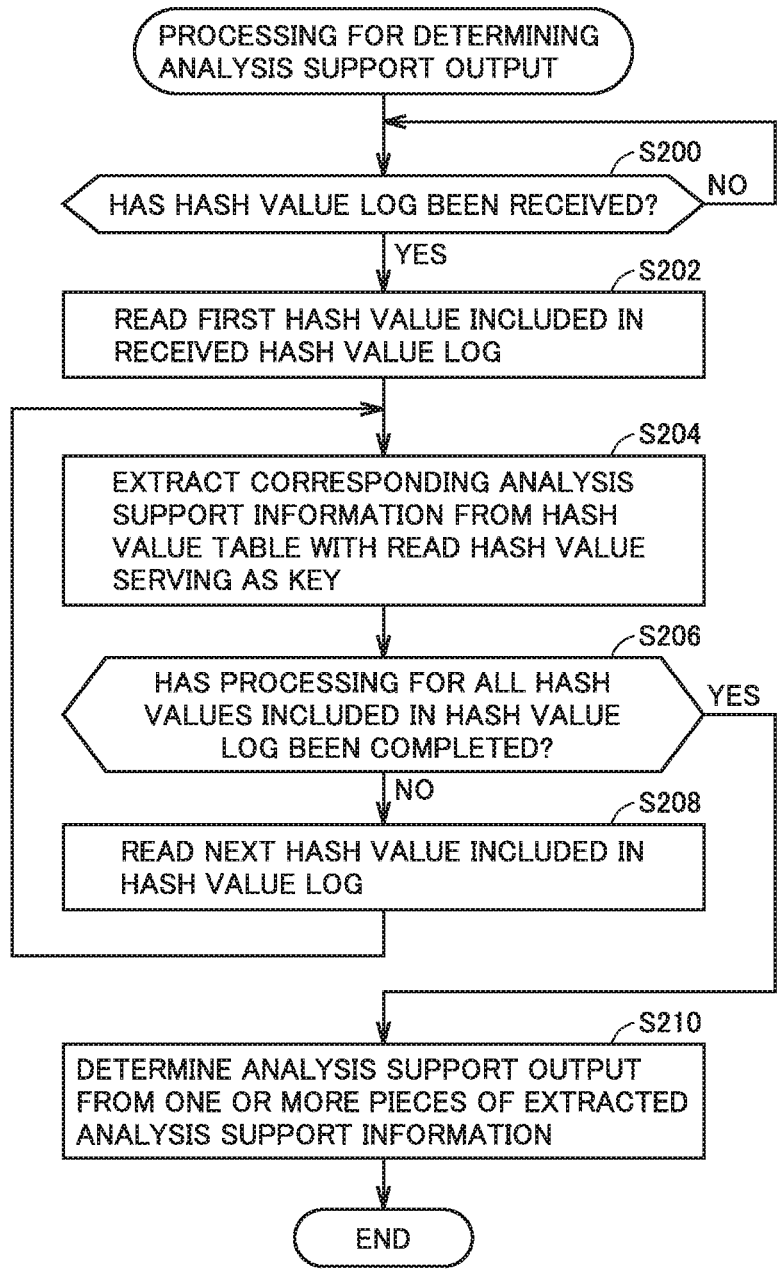

| 1 | 47D4B39FA31F7D04F0AFFDE |
| 2 | 7C968AD5E283EF46DED0249 |
| 3 | 47D4B39FA31F7D04F0AFFDE |
| 4 | 7C968AD5E283EF46DED0249 |
| 5 | 1EE723CB21092F540E81D351 |
| ... | ... |

| 2019/07/01 16:00:00 | 47D4B39FA31F7D04F0AFFDE |
| 2019/07/01 16:00:01 | 7C968AD5E283EF46DED0249 |
| 2019/07/01 16:00:02 | 47D4B39FA31F7D04F0AFFDE |
| 2019/07/01 16:00:03 | 7C968AD5E283EF46DED0249 |
| 2019/07/01 16:00:04 | 1EE723CB21092F540E81D351 |
| ... | ... |

27     24

INFORMATION PROCESSING SYSTEM, INFORMATION PROCESSING METHOD, AND DEVELOPMENT APPARATUS

This nonprovisional application is based on Japanese Patent Application No. 2019-158338 filed with the Japan Patent Office on Aug. 30, 2019, the entire contents of which are hereby incorporated by reference.

FIELD

The present disclosure relates to a technology for collecting information involved with execution of a program suitable for debugging or improvement of a program.

BACKGROUND AND SUMMARY

Conventionally, in various programs including a video game, a bug that had not been found in a development phase has sometimes been found. In addition, a scheme that allows more efficient debugging of a program also in a program development phase has been demanded.

For example, in the field of a game machine, a system that expedites solution of a problem by sending an image of an error screen or a setting screen on a game machine provided in an amusement arcade or a store to a server apparatus is disclosed.

Though such a known technology provides as a solution, transmission of an image of a shown error screen or setting screen, a data size of the transmitted image is relatively large.

The present disclosure is directed to solution of a problem as described above, and an object thereof is to provide a solution that allows collection of information involved with execution of a program in a smaller data size.

An information processing system including one or more processors according to one embodiment generates a program so as to output a hash value calculated based on a hash value calculation instruction included in a source code for generating the program, determines a set of analysis support information associated with the hash value calculation instruction and the hash value calculated based on the hash value calculation instruction, stores the set of the analysis support information and the hash value, stores at least a part of one or more hash values output as a result of execution of the program, and outputs, by using at least the part of the stored hash value, the analysis support information that makes the set with the hash value.

According to the configuration, since a hash value relatively small in data size is output in response to execution of a program, information involved with execution of the program can be collected in a smaller data size.

The information processing system may generate the program so as to output the calculated hash value at a position corresponding to the hash value calculation instruction. According to the configuration, various types of analysis can be conducted in accordance with a position corresponding to the output hash value.

The information processing system may output corresponding analysis support information with an error caused during execution of the program serving as a reference. According to the configuration, when some kind of error is caused as a result of execution of a program, necessary analysis support information can be output with the caused error serving as the reference.

The information processing system may regard the hash value calculation instruction included in the source code as an instruction to arrange a corresponding hash value. According to the configuration, since information on the hash value calculation instruction included in the source code is not incorporated in a generated program, a data size of the program itself can be suppressed and information involved with development of the program or the like can be concealed.

The analysis support information may include information that identifies a source code where a corresponding hash value calculation instruction has been included and information that identifies a position where the corresponding hash value calculation instruction has been included. According to the configuration, when some hash value is output as a result of execution of a program, which position in the program has been executed can be identified.

The analysis support information may include information on revision of a source code where a corresponding hash value calculation instruction has been included. According to the configuration, when some hash value is output as a result of execution of a program, from which revision of the program the hash value has been originated can be identified.

The information processing system may further store information that identifies an order of hash values output as a result of execution of the program. According to the configuration, a state of execution of the program can more readily be estimated.

The information processing system may chronologically store hash values output as a result of execution of the program, without depending on whether or not an error is caused during execution of the program. According to the configuration, since a hash value is always stored during execution of a program, a state of execution of the program can be estimated during any period.

The information processing system may hold, when an error is caused during execution of the program, hash values over a prescribed period associated with timing of occurrence of the error or a prescribed number of hash values associated with timing of occurrence of the error. According to the configuration, since information relating to a caused error can selectively be shown, investigation of a cause can be more efficient.

An information processing method according to another embodiment includes generating a program so as to output a hash value calculated based on a hash value calculation instruction included in a source code for generating the program, determining a set of analysis support information associated with the hash value calculation instruction and the hash value calculated based on the hash value calculation instruction, storing the set of the analysis support information and the hash value, storing at least a part of one or more hash values output as a result of execution of the program, and outputting, by using at least the part of the stored hash value, the analysis support information that makes the set with the hash value.

An information processing system including one or more processors according to still another embodiment generates a program so as to output a hash value calculated based on a hash value calculation instruction included in a source code for generating the program, determines a set of analysis support information associated with the hash value calculation instruction and the hash value calculated based on the hash value calculation instruction, stores the set of the analysis support information and the hash value, and outputs, by using at least a part of one or more hash values output as a result of execution of the program, the analysis support information that makes the set with the hash value.

An information processing method according to yet another embodiment includes generating a program so as to output a hash value calculated based on a hash value calculation instruction included in a source code for generating the program, determining a set of analysis support information associated with the hash value calculation instruction and the hash value calculated based on the hash value calculation instruction, storing the set of the analysis support information and the hash value, and outputting, by using at least a part of one or more hash values output as a result of execution of the program, the analysis support information that makes the set with the hash value.

A development apparatus including one or more processors according to still another embodiment generates a program so as to output a hash value calculated based on a hash value calculation instruction included in a source code for generating the program, determines a set of analysis support information associated with the hash value calculation instruction and the hash value calculated based on the hash value calculation instruction, stores the set of the analysis support information and the hash value, and stores at least a part of one or more hash values output as a result of execution of the program.

A program for a development apparatus according to still another embodiment causes a computer to perform generating a program so as to output a hash value calculated based on a hash value calculation instruction included in a source code for generating the program, determining a set of analysis support information associated with the hash value calculation instruction and the hash value calculated based on the hash value calculation instruction, storing the set of the analysis support information and the hash value, and storing at least a part of one or more hash values output as a result of execution of the program.

An information processing system including one or more processors according to yet another embodiment stores a set of analysis support information and a hash value, the set of the analysis support information and the hash value being the analysis support information and the hash value as being associated with each other, the analysis support information being associated with a hash value calculation instruction included in a source code for generating a program, the hash value being calculated based on the hash value calculation instruction, and outputs, by using at least a part of one or more hash values output as a result of execution of the program, the analysis support information that makes the set with the hash value The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 shows an exemplary illustrative non-limiting drawing illustrating a hash value table calculated by the development apparatus in the information processing system according to the present embodiment.

FIG. 9 shows an exemplary illustrative non-limiting drawing illustrating a flowchart showing a procedure in processing for determining an analysis support output in the information processing system according to an embodiment.

FIGS. 11A and 11B show exemplary illustrative non-limiting drawings illustrating data structures of a hash value log collected in the information processing system according to the present embodiment.

DETAILED DESCRIPTION OF NON-LIMITING EXAMPLE EMBODIMENTS

Figure 1:
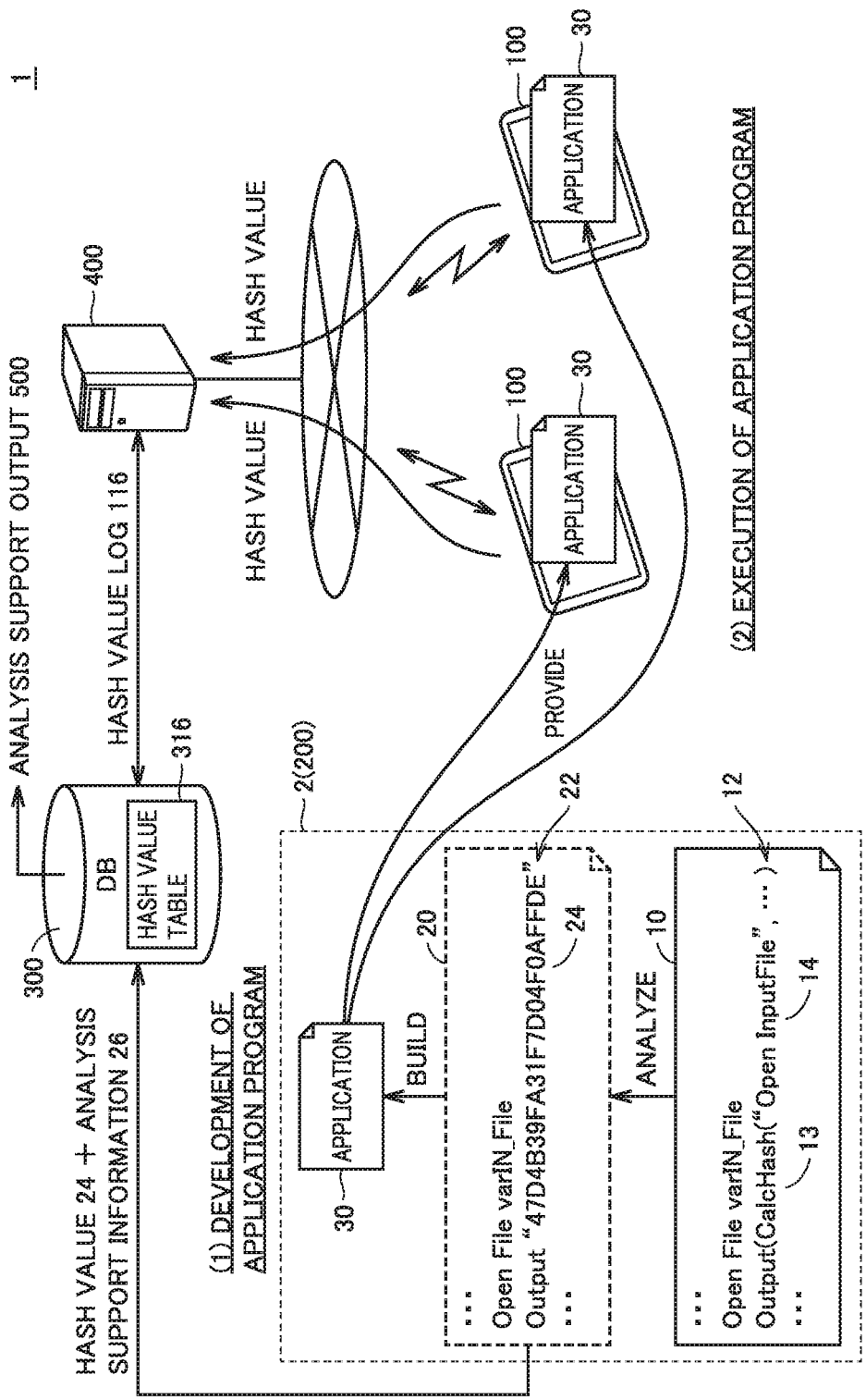
FIG. 1 shows an exemplary illustrative non-limiting drawing illustrating an information processing system according to the present embodiment.

The present embodiment will be described in detail with reference to the drawings. The same or corresponding elements in the drawings have the same reference characters allotted and description thereof will not be repeated.

A. Overview

An overview of an information processing system 1 according to the present embodiment will initially be described. Information processing system 1 provides a configuration that allows facilitated collection of information involved with execution of an arbitrary program.

Referring to FIG. 1, information processing system 1 encompasses three aspects of (1) development of an application program 30, (2) execution of application program 30, and (3) collection and analysis of information output as a result of execution of application program 30.

Information processing system 1 typically includes one or a plurality of terminal devices 100, a development apparatus 200, a database server 300, and a data collection server 400. (1) Development of application program 30 is mainly carried out by development apparatus 200, (2) execution of application program 30 is mainly carried out by each of one or more terminal devices 100, and (3) collection and analysis of a hash value output as a result of execution of application program 30 is mainly carried out by database server 300 and data collection server 400.

(1) Development of Application Program 30

Application program 30 is developed by utilizing a development environment 2 provided by one or more development apparatuses 200. Application program 30 is basically in an executable form and includes such instruction codes as being executable by a processor of terminal device 100. Some or all of codes of application program 30 may be in a format of an intermediate code.

More specifically, a developer creates a source code 10 for generating application program 30. The developer can arrange at an arbitrary position in source code 10, an instruction (which is also referred to as a "hash output instruction" below) for determining information (which is also referred to as "analysis support information" below) that will support, when some kind of error or event occurs in application program 30, investigation of a cause thereof.

The "analysis support information" herein encompasses arbitrary information that can be utilized for estimating a state of execution of an arbitrary program and arbitrary information that can be utilized for investigating a cause of some kind of error caused in an arbitrary program.

A hash output instruction 12 may be arranged within source code 10 as a part of exception handling or may be arranged immediately after arbitrary target processing included in source code 10.

In source code 10 shown in FIG. 1, hash output instruction 12 is defined in a form of a function in which a hash value calculation instruction 13 and an argument 14 are designated. Hash value calculation instruction 13 is an instruction for calculating a hash value in compilation. For example, an arbitrary character string can be set as argument 14.

Development apparatus 200 generates application program 30 by compiling source code 10. Contents in source code 10 are analyzed as a part of processing for compilation of source code 10. In this content analysis, development apparatus 200 (a compiler 2141 shown in FIG. 3) interprets source code 10 and generates (builds) application program 30 so as to output a hash value 24 calculated based on hash value calculation instruction 13 included in source code 10. Concurrently, development apparatus 200 (a table generation module 2142 shown in FIG. 3) determines a set of analysis support information 26 associated with hash value calculation instruction 13 and hash value 24 calculated based on hash value calculation instruction 13.

Calculated hash value 24 may be arranged to be output at a position corresponding to hash value calculation instruction 13. Alternatively, calculated hash value 24 and a position where hash value 24 should be output may be associated with each other and relation between hash value 24 and the position may be stored with an arbitrary method.

For the sake of convenience of description, FIG. 1 shows a pseudo source code 20 which indicates how source code 10 is interpreted during the course of processing for compilation of source code 10. Though a part of processing contents will be described below based on pseudo source code 20, a substance of pseudo source code 20 does not have to be generated.

Hash value 24 determined based on hash value calculation instruction 13 can have any number of digits (data length). Any method of determining hash value 24 in hash value calculation instruction 13 can also be employed.

In pseudo source code 20, instead of hash value calculation instruction 13 of interest of hash output instruction 12 of source code 10, specific hash value 24 is arranged. Therefore, only information on calculated hash value 24 is basically incorporated into application program 30. Hash value 24 incorporated into application program 30 is output when a position in source code 10 (or pseudo source code 20) where hash output instruction 12 and hash value calculation instruction 13 are arranged is executed. Namely, application program 30 in which a program structure of pseudo source code 20 is reflected is generated.

Though FIG. 1 shows exemplary source code 10 including only a single hash output instruction 12 and only a single hash value calculation instruction 13, a plurality of hash output instructions 12 and a plurality of hash value calculation instructions 13 can be arranged in arbitrary combination at an arbitrary position in source code 10.

Programs generated by development apparatuses 200 may be integrated to implement one application program 30. Generated application program 30 is provided to each of one or more terminal devices 100 with an arbitrary method.

A set of analysis support information 26 determined by content analysis of source code 10 and hash value 24 is stored in database server 300 as a hash value table 316. Hash value table 316 may be stored in development apparatus 200. With hash value 24 serving as a key, hash value table 316 stores corresponding analysis support information 26. Namely, hash value table 316 corresponds to dictionary data including analysis support information 26 with hash value 24 serving as a key.

(2) Execution of Application Program 30

As application program 30 is executed by each of one or more terminal devices 100, hash values 24 are output from one or more hash value output instructions 22 embedded in application program 30. Output hash values 24 are in conformity with a state of execution of application program 30. In accordance with in which order a plurality of instructions included in application program 30 have been executed, the order of hash values 24 output from one or more hash value output instructions 22 is also varied. Therefore, investigation of a cause of an error, debugging, or the like can be carried out while referring also information on the order of hash values 24 and corresponding analysis support information 26.

Hash values 24 output from application program 30 executed in terminal device 100 may successively be stored in terminal device 100, or may be transmitted from terminal device 100 to data collection server 400 periodically or when some kind of transmission condition is satisfied.

(3) Collection and Analysis of Hash Value Output as a Result of Execution of Application Program 30

One or more hash values 24 output as a result of execution of application program 30 in terminal device 100 may be transmitted to data collection server 400. As will be described later, hash value 24 may be used as being stored in terminal device 100.

Data collection server 400 outputs one or more hash values 24 transmitted from one or more terminal devices 100 to database server 300.

With one or more hash values 24 from data collection server 400 serving as a key, database server 300 extracts analysis support information 26 corresponding to each hash value 24 by searching hash value table 316. Database server 300 then outputs an analysis support output 500 including extracted analysis support information 26. Database server 300 uses at least a part of a hash value stored in terminal device 100 or data collection server 400 to output analysis support information 26 that makes the set with the hash value.

A developer can investigate a cause of an error caused in application program 30 or perform debugging by referring to output analysis support output 500.

Thus, in information processing system 1 according to the present embodiment, by embedding an instruction to output information for supporting investigation of a cause of an error or debugging in source code 10 in a phase of development of application program 30, a trouble such as an error that may be caused in application program 30 is more readily addressed.

In information processing system 1 according to the present embodiment, since only hash value 24 is output as a result of execution of application program 30, a data size can be reduced. Since the meaning of output hash value 24 is not known unless hash value table 316 is referred to, the possibility of analysis of application program 30 by a malicious third party based on information output from application program 30 can be lowered.

B. Hardware Configuration

An exemplary hardware configuration of information processing system 1 according to the present embodiment will initially be described.

(b1: Exemplary Configuration of Terminal Device 100)

Figure 2:
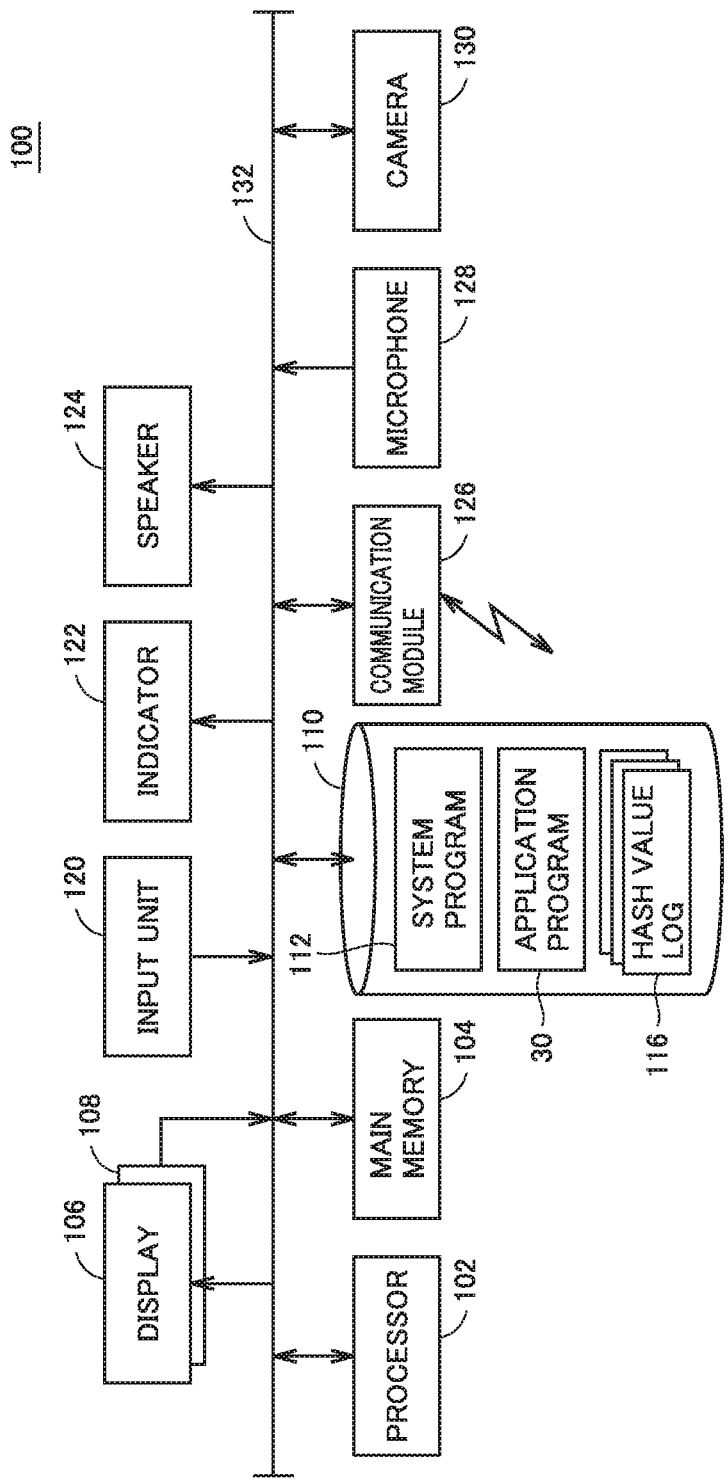
FIG. 2 shows an exemplary illustrative non-limiting drawing illustrating a hardware configuration of a terminal device according to the present embodiment.

Referring to FIG. 2, terminal device 100 encompasses an arbitrary computer that can execute an application program. Typically, a portable (or mobile) general-purpose computer such as a smartphone or a tablet is assumed as terminal device 100, however, terminal device 100 may be a portable or stationary personal computer or a computer such as a console dedicated for a game.

Terminal device 100 includes, as its main hardware components, a processor 102, a main memory 104, a display 106, a touch panel 108, a storage 110, an input unit 120, an indicator 122, a speaker 124, a communication module 126, a microphone 128, and a camera 130. These hardware components are communicatively connected to one another through a bus 132.

Processor 102 is a processing unit that executes an instruction in accordance with a program code developed on main memory 104 and implemented, for example, by a central processing unit (CPU) or a graphics processing unit (GPU).

Main memory 104 is a non-volatile storage that temporarily stores a program code for processor 102 to execute an instruction or various types of working data, and implemented, for example, by a dynamic random access memory (DRAM) or a static random access memory (SRAM).

Display 106 shows video information generated by computation in processor 102, and it is implemented, for example, by a display device such as a liquid crystal display (LCD) or an organic electroluminescent (EL) display.

Touch panel 108 is arranged on a display surface of display 106 and accepts a user operation. More specifically, touch panel 108 outputs information representing a touch operation by a user to processor 102.

Storage 110 is a non-volatile storage that stores data used or generated in terminal device 100 in a non-volatile manner, and implemented, for example, by a flash memory or a hard disk drive. Typically, storage 110 stores a system program 112 including an operating system (OS) or a driver and application program 30 for substantially performing game processing. Application program 30 may perform game processing while using a library provided by system program 112.

Storage 110 may further store hash value log 116 including one or more hash values 24 output during execution of application program 30. Storage 110 stores at least a part of one or more hash values 24 output as a result of execution of application program 30. For example, all of hash values 24 output as a result of execution of application program 30 may be stored. For example, when hash value 24 output as a result of execution of application program 30 has a sufficiently large number of digits, however, only a part of output hash value 24 (for example, eight characters from the top) may be stored.

Application program 30 may be stored in storage 110 in a phase of manufacturing of terminal device 100 or may be provided by downloading from an arbitrary distribution server (not shown). Furthermore, a computer readable storage medium (for example, a universal serial bus (USB) memory or an arbitrary memory card) (not shown) that stores application program 30 thereon may be attached to terminal device 100 and application program 30 may be read from the attached computer readable storage medium to be installed in storage 110.

Input unit 120 is implemented, for example, by an input device such as one or more buttons or a mouse that accept(s) a user operation.

Indicator 122 is arranged as being exposed at a housing of terminal device 100 and visually gives arbitrary information to a user of terminal device 100. Indicator 122 is implemented, for example, by a light emitting device such as a light emitting diode (LED).

Speaker 124 is arranged as being exposed at the housing of terminal device 100 and provides arbitrary audio information to a user of terminal device 100.

Communication module 126 is a module for wireless communication with an external apparatus, and implemented, for example, by a wide-range communication module in conformity with fifth generation (5G), long term evolution (LTE), or WiMAX or a narrow-range communication module in conformity with a wireless local area network (LAN), Bluetooth□, or infrared communication.

Microphone 128 is arranged as being exposed at the housing of terminal device 100 and collects voice and sound generated around terminal device 100.

Camera 130 is arranged as being exposed at the housing of terminal device 100 and outputs an image obtained by image pick-up around terminal device 100.

Though FIG. 2 illustrates an implementation of various types of processing by execution of a program (system program 112 and application program 30) by processor 102 (that is, software implementation), a part of such processing may be implemented by hard-wired circuitry. Specifically, processing circuitry including an application specific integrated circuit (ASIC) or a field-programmable gate array (FPGA) may be responsible for a part of processing to be performed by terminal device 100 according to the present embodiment. The processing circuitry may include processor 102 and main memory 104. Therefore, processing involved with terminal device 100 according to the present embodiment may also be said as being performed by processing circuitry including processor 102 and main memory 104 and/or hard-wired circuitry such as an ASIC or an FPGA.

(b2: Exemplary Configuration of Development Apparatus 200)

Figure 3:
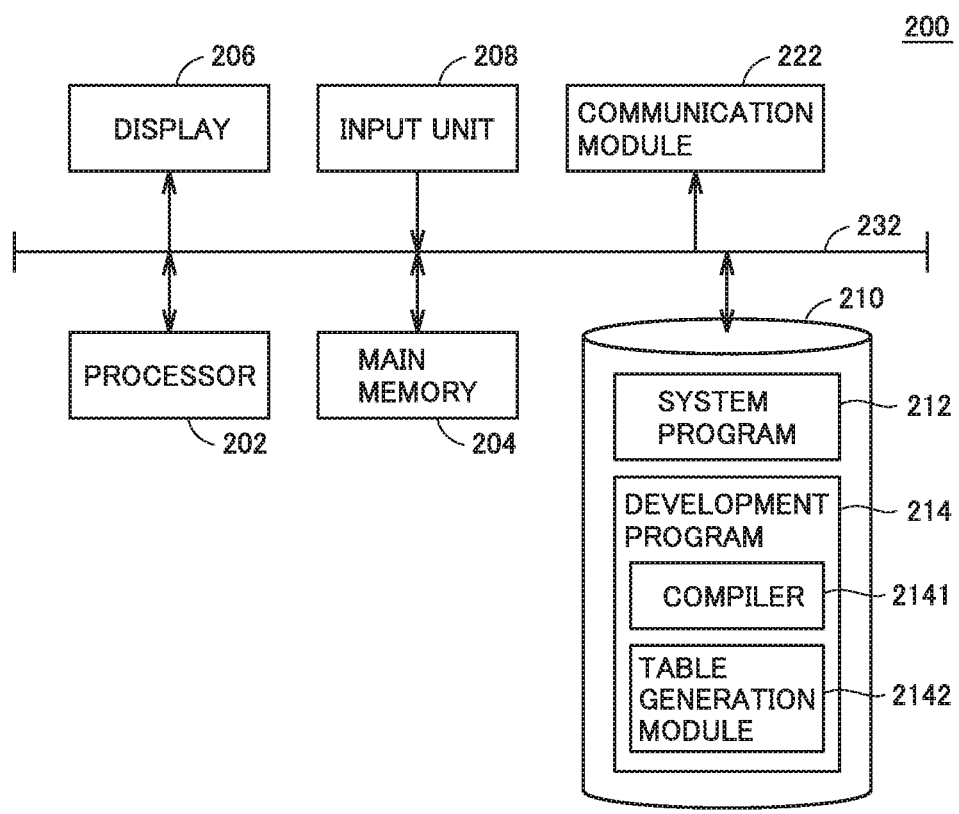
FIG. 3 shows an exemplary illustrative non-limiting drawing illustrating a hardware configuration of a development apparatus according to the present embodiment.

Referring to FIG. 3, development apparatus 200 encompasses an arbitrary computer that provides an environment for developing an application program. Typically, development apparatus 200 is implemented by a stationary or portable personal computer.

Development apparatus 200 includes, as its main hardware components, a processor 202, a main memory 204, a display 206, an input unit 208, a storage 210, and a communication module 222. These hardware components are communicatively connected to one another through a bus 232.

Processor 202 is a processing unit that executes an instruction in accordance with a program code developed on main memory 204 and implemented, for example, by a CPU or a GPU.

Main memory 204 is a non-volatile storage that temporarily stores a program code for processor 202 to execute an instruction or various types of working data, and implemented, for example, by a DRAM or an SRAM.

Display 206 shows video information generated by computation in processor 202, and it is implemented, for example, by a display device such as an LCD or an organic EL display.

Input unit 208 is implemented, for example, by an input device such as a mouse or a keyboard that accepts a user operation.

Storage 210 is a non-volatile storage that stores data used or generated in development apparatus 200 in a non-volatile manner, and implemented, for example, by a flash memory or a hard disk drive. Typically, storage 210 stores a system program 212 including an OS or a driver and a development program 214 for developing an application program.

Development program 214 performs processing necessary for creation and edition of a source code of an application program, compilation of a source code, and development of a package into an application program in an executable form. More specifically, development program 214 includes compiler 2141 and a table generation module 2142. Compiler 2141 corresponds to generation means and is responsible for processing involved with generation of an application program from a source code. Table generation module 2142 corresponds to determination means and determines a set of analysis support information and a hash value. Details thereof will be described later.

Development program 214 may be stored in storage 210 in a phase of manufacturing of development apparatus 200 or may be provided by downloading from an arbitrary distribution server (not shown). Furthermore, a computer readable storage medium (for example, a USB memory or an arbitrary memory card) (not shown) that stores development program 214 thereon may be attached to development apparatus 200 and development program 214 may be read from the attached computer readable storage medium to be installed in storage 210.

Though an exemplary configuration in which compiler 2141 and table generation module 2142 are independent of each other is shown, these modules may be integrated into a single module. Compilation processing shown in FIG. 6 may be performed by compiler 2141 and table generation module 2142 each performing processing or by the integrated module performing all processing.

Communication module 222 is a module for wireless communication with an external apparatus and implemented, for example, by a module in conformity with Ethernet☐ or a wireless LAN.

Though FIG. 3 illustrates an implementation of various types of processing by execution of a program (system program 212 and development program 214) by processor 202 (that is, software implementation), a part of such processing may be implemented by hard-wired circuitry. Specifically, processing circuitry including an ASIC or an FPGA may be responsible for the entirety or a part of processing to be performed by development apparatus 200 according to the present embodiment. The processing circuitry may include processor 202 and main memory 204.

Therefore, processing involved with development apparatus 200 according to the present embodiment may also be said as being performed by processing circuitry including processor 202 and main memory 204 and/or hard-wired circuitry such as an ASIC or an FPGA.

(b3: Exemplary Configuration of Database Server 300)

Figure 4:
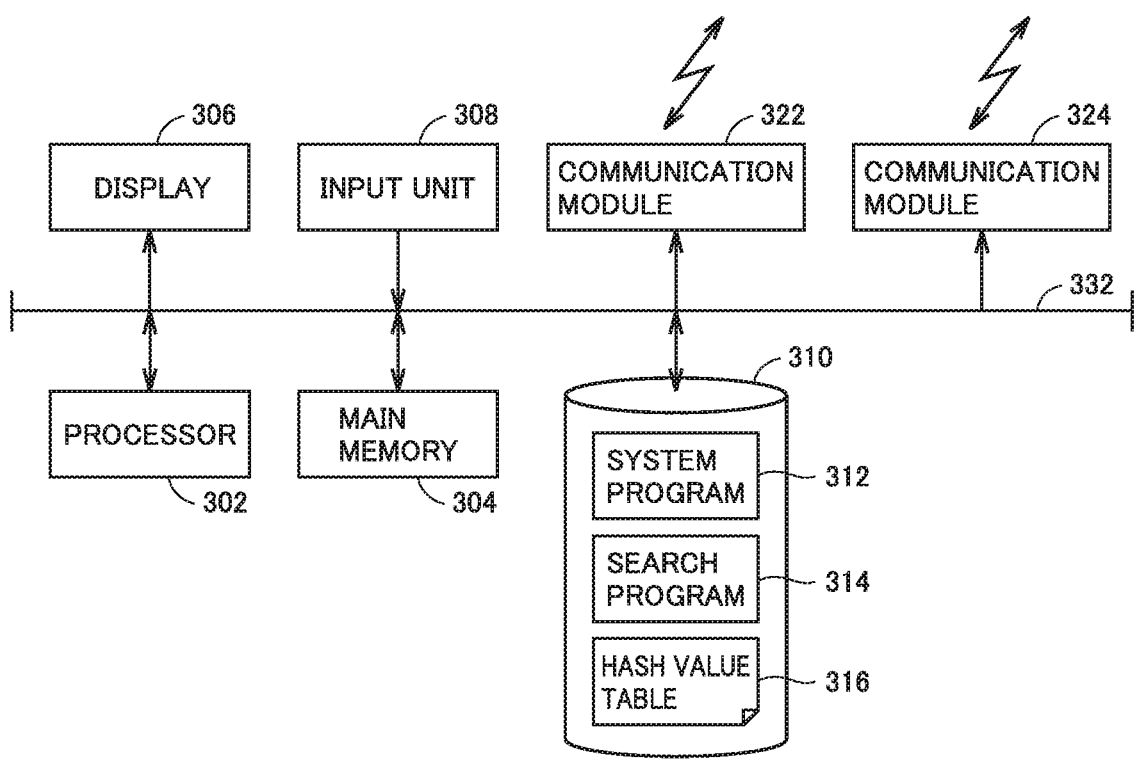
FIG. 4 shows an exemplary illustrative non-limiting drawing illustrating a hardware configuration of a database server according to the present embodiment.

Referring to FIG. 4, database server 300 encompasses an arbitrary computer that stores information brought in correspondence with a hash value as will be described later. Typically, database server 300 is implemented by a networked general-purpose computer. Database server 300 may be implemented by a single computer or a plurality of computers in coordination with one another. Each computer includes one or more processors. Each processor included in each computer may include a plurality of processor cores.

Database server 300 includes, as its main hardware components, a processor 302, a main memory 304, a display 306, an input unit 308, a storage 310, and communication modules 322 and 324. These hardware components are communicatively connected to one another through a bus 332. Since these hardware components are similar to the hardware components in development apparatus 200 shown in FIG. 3, detailed description will not be repeated.

Typically, storage 310 stores a system program 312 including an OS or a driver, a search program 314 for performing search processing as will be described later, and hash value table 316 generated by development apparatus 200.

Search program 314 gives information stored in hash value table 316 in response to a search request in which a hash value serves as a key.

Though FIG. 4 illustrates an implementation of various types of processing by execution of a program (system program 312 and search program 314) by processor 302 (that is, software implementation), a part of such processing may be implemented by hard-wired circuitry. Specifically, processing circuitry including an ASIC or an FPGA may be responsible for the entirety or a part of processing to be performed by database server 300 according to the present embodiment. The processing circuitry may include processor 302 and main memory 304. Therefore, processing involved with database server 300 according to the present embodiment may also be said as being performed by processing circuitry including processor 302 and main memory 304 and/or hard-wired circuitry such as an ASIC or an FPGA.

(b4: Exemplary Configuration of Data Collection Server 400)

Since an exemplary hardware configuration of data collection server 400 according to the present embodiment is similar to the exemplary hardware configuration of database server 300 shown in FIG. 4, detailed description will not be repeated. The storage of data collection server 400, however, does not store search program 314 and hash value table 316 (FIG. 4).

C. Compilation and Generation of Hash Value Table 316

Processing for compiling source code 10 for generating application program 30 will now be described.

Figure 5:
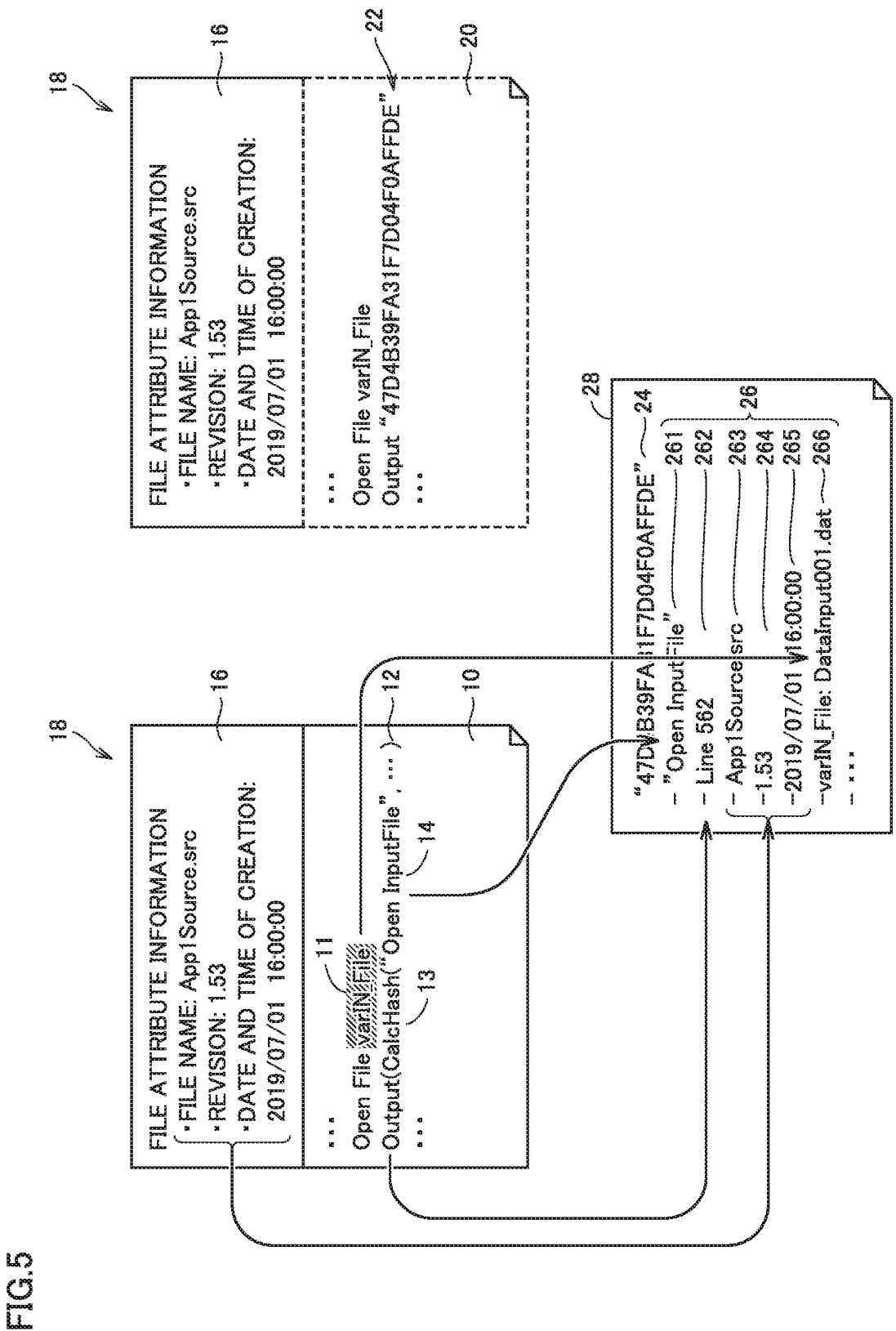
FIG. 5 shows an exemplary illustrative non-limiting drawing illustrating compilation processing in the development apparatus in the information processing system according to the present embodiment.

Compilation processing in development apparatus 200 in information processing system 1 according to the present embodiment will be described with reference to FIG. 5. FIG. 5 shows an example where source code 10 includes hash output instruction 12 as in FIG. 1. In hash output instruction 12, hash value calculation instruction 13 and argument 14 are designated. Hash output instruction 12 may contain hash value calculation instruction 13 or may use a hash value calculated based on hash value calculation instruction 13 at a different location. An arbitrary character string (in this example, "Open InputFile") is set as argument 14. This arbitrary character string can also be used as a kind of comment.

(Development program 214 of) development apparatus 200 determines analysis support information 26 associated with hash value calculation instruction 13, by content analysis of source code 10. For example, analysis support information 26 may include at least any one of an arbitrary character string 261, a line number 262, a source code file name 263, source code revision 264, date and time of update 265, and an arbitrary constant value 266.

Arbitrary character string 261 is a character string arbitrarily input in association with hash value calculation instruction 13 included in source code 10. Contents of arbitrary character string 261, the number of characters therein, and a length of arbitrary character string 261 are not restricted, and a developer can include arbitrary characters therein.

Line number 262 is information indicating a position where hash value calculation instruction 13 included in source code 10 is located, and a value of the line number is calculated and determined by content analysis of source code 10 by development apparatus 200. Line number 262 corresponds to information that identifies a position in source code 10 where corresponding hash value calculation instruction 13 has been included.

Source code file name 263, source code revision 264, and date and time of update 265 are typical examples of attribute information 16 (meta information) included in a source code file 18 including source code 10. Without being limited to such information, arbitrary information included in source code file 18 may be output as analysis support information 26. Source code file name 263 corresponds to information that identifies source code 10 where corresponding hash value calculation instruction 13 has been included. Source code revision 264 corresponds to information on revision of source code 10 where corresponding hash value calculation instruction 13 has been included. Date and time of update 265 also corresponds to a kind of information on revision of source code 10 where corresponding hash value calculation instruction 13 has been included.

Arbitrary constant value 266 means a value calculated during compilation of source code 10, and so long as a value of a variable that is supposed to dynamically vary can be determined during compilation, a calculated value thereof is output as arbitrary constant value 266. In this example, "varIN_File" as a variant 11 in source code 10 is determined to mean "DataInput001.dat".

Development apparatus 200 outputs a record 28 including a set of analysis support information 26 and hash value 24. This record 28 is successively added to hash value table 316 in database server 300.

Hash value 24 calculated based on hash value calculation instruction 13 may be calculated totally randomly or may be calculated with a part or the entirety of analysis support information 26 serving as a seed.

Figure 6:
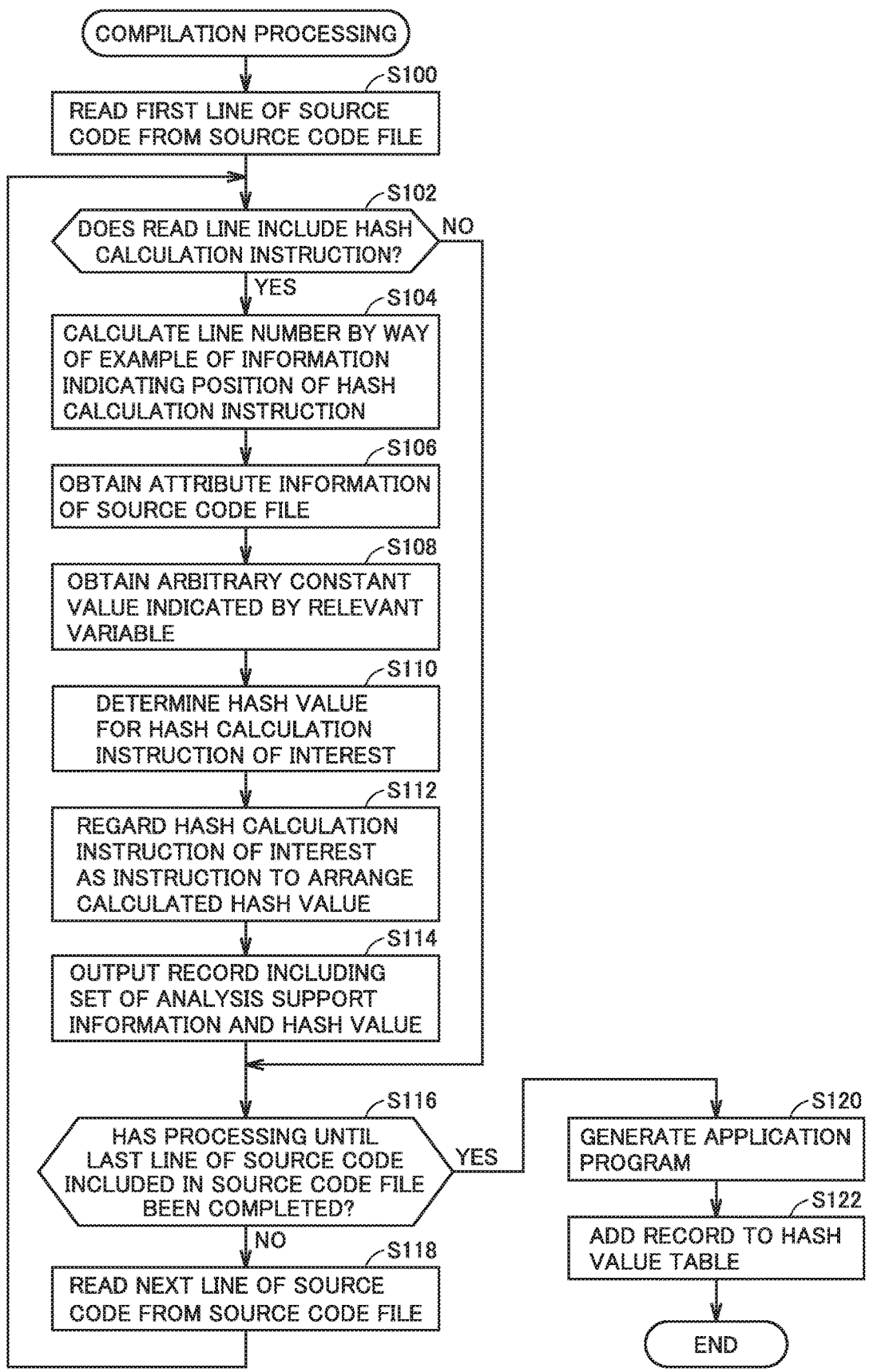
FIG. 6 shows an exemplary illustrative non-limiting drawing illustrating a flowchart showing a main part of the compilation processing in the development apparatus in the information processing system according to the present embodiment.

Compilation processing in development apparatus 200 in information processing system 1 according to the present embodiment will be described with reference to FIG. 6. Each step shown in FIG. 6 is typically performed by execution of development program 214 (compiler 2141 and table generation module 2142) by processor 202 of development apparatus 200.

Development apparatus 200 reads a first line of source code 10 from source code file 18 (step S100) and determines whether or not the read line includes hash value calculation instruction 13 (step S102).

When the first line includes hash value calculation instruction 13 (YES in step S102), development apparatus 200 performs processing for generating application program 30 so as to output hash value 24 calculated based on hash value calculation instruction 13 included in source code 10 for generating application program 30. Concurrently, development apparatus 200 determines a set of analysis support information 26 associated with hash value calculation instruction 13 and hash value 24 calculated based on hash value calculation instruction 13.

More specifically, development apparatus 200 calculates a line number by way of example of information indicating a position of hash value calculation instruction 13 in source code 10 (step S104) and development apparatus 200 obtains attribute information 16 of source code file 18 (step S106). Development apparatus 200 obtains an arbitrary constant value indicated by a relevant variable (step S108). Then, development apparatus 200 determines hash value 24 for hash value calculation instruction 13 of interest (step S110) and regards hash value calculation instruction 13 of interest as an instruction to arrange calculated corresponding hash value 24 (step S112). Furthermore, development apparatus 200 outputs record 28 including a set of analysis support information 26 associated with hash value calculation instruction 13 (information collected in steps S104 to S108) and hash value 24 calculated based on hash value calculation instruction 13 (that is, the set of analysis support information 26 and hash value 24 calculated based on associated hash value calculation instruction 13) (step S114).

When the first line does not include hash value calculation instruction 13 (NO in step S102), processing in steps S104 to S114 is skipped.

Development apparatus 200 determines whether or not processing until the last line of source code 10 included in source code file 18 has been completed (step S116). When processing until the last line of source code 10 included in source code file 18 has not been completed (NO in step S116), development apparatus 200 reads a next line of source code 10 from source code file 18 (step S118) and performs again processing in step S102 and subsequent steps.

When processing until the last line of source code 10 included in source code file 18 has been completed (YES in step S116), development apparatus 200 regards hash value calculation instruction 13 in source code 10 as an instruction to arrange a corresponding hash value (corresponding to hash value 24 output in response to hash value output instruction 22 in pseudo source code 20) and generates application program 30 from source code 10 (or pseudo source code 20) (step S120). Development apparatus 200 stores the determined set of analysis support information 26 and hash value 24. More specifically, development apparatus 200 adds record 28 output in step S114 to hash value table 316 (step S122). When hash value table 316 does not exist, hash value table 316 is newly generated. Then, processing for generating application program 30 ends.

D. Determination and Utilization of Hash Value Table 316

Determination and utilization of hash value table 316 in processing for compiling source code 10 for generating application program 30 will now be described.

Referring to FIG. 7, hash value table 316 includes a hash value column 3161, an arbitrary character string column 3162, a line number column 3163, a source code file name column 3164, a source code revision column 3165, a date-and-time-of-update column 3166, and an arbitrary constant value column 3167.

Record 28 determined by development apparatus 200 is successively added to hash value table 316. Hash value 24 included in record 28 is stored in hash value column 3161, and analysis support information 26 included in record 28 (arbitrary character string 261, line number 262, source code file name 263, source code revision 264, date and time of update 265, and arbitrary constant value 266) is stored in arbitrary character string column 3162, line number column 3163, source code file name column 3164, source code revision column 3165, date-and-time-of-update column 3166, and arbitrary constant value column 3167.

Hash value table 316 may be generated for each source code 10 or for each source code file. Since collision between hash values 24 does not substantially occur by preparing hash value 24 sufficiently large in number of digits, analysis support information 26 corresponding to hash values output from a plurality of application programs 30 may be stored together in the same hash value table 316.

By referring to values in source code file name column 3164 and source code revision column 3165 included in hash value table 316 shown in FIG. 7, from which application program 30 hash value 24, to which analysis support information 26 corresponds, has been output can be identified.

By using hash value table 316 as shown in FIG. 7, a state of execution of application program 30 can be estimated based on one or more hash values 24 output from arbitrary application program 30.

Figure 8A:
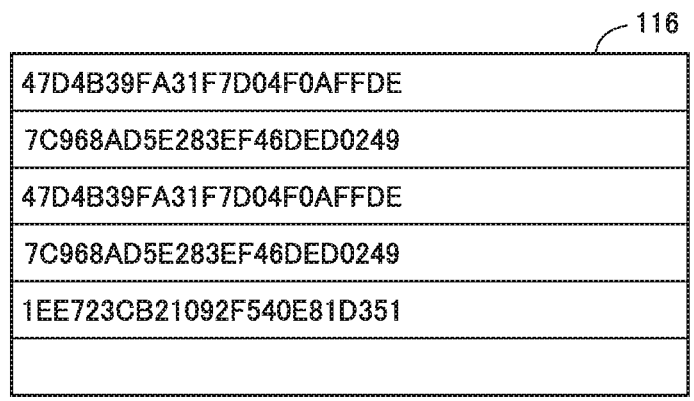
FIGS. 8A and 8B show exemplary illustrative non-limiting drawings illustrating hash value tables calculated by the development apparatus in the information processing system according to the present embodiment.

Referring to FIG. 8A, it is assumed that hash value log 116 including one or more hash values 24 output as a result of execution of application program 30 in any terminal device 100 is provided to database server 300 through data collection server 400 or the like.

By referring to hash value table 316 with each hash value 24 included in hash value log 116 serving as a key, data collection server 400 extracts analysis support information 26 (see FIG. 7 or the like) corresponding to hash value 24 serving as the key. Then, the data collection server formats one or more pieces of extracted analysis support information 26 and then determines analysis support output 500 as shown in FIG. 8B.

Determined analysis support output 500 is provided to a developer of application program 30 of interest in an arbitrary format. For example, the analysis support output may be shown on display 306 connected to database server 300 or output as a printed matter from an arbitrary printing device. Alternatively, a web server function may be implemented in database server 300 so that web access can be made from an arbitrary browser by using the web server function.

Figure 8B:
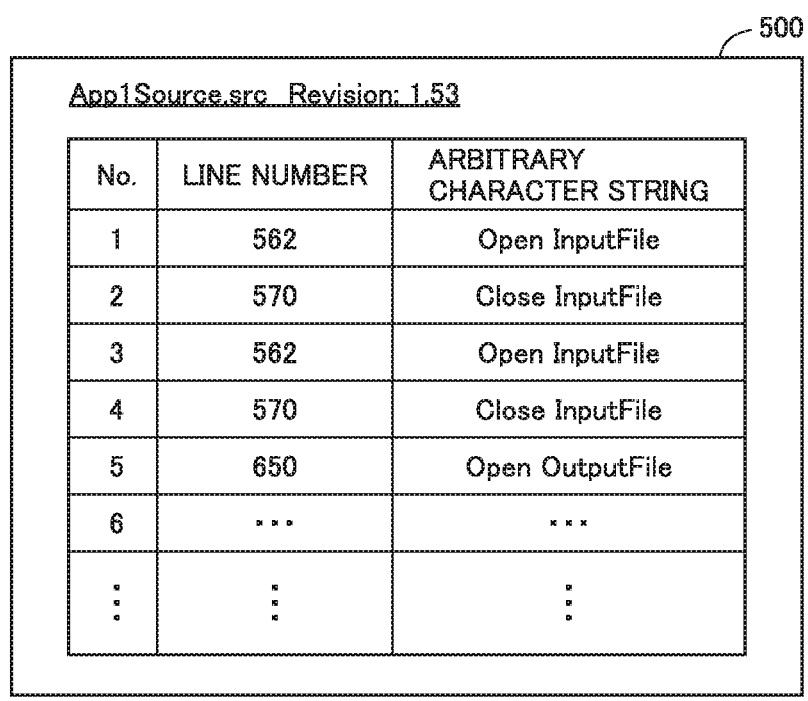

Analysis support output 500 in FIG. 8B shows that processing for outputting hash values 24 located at a line number 562 and a line number 570 was performed repeatedly two times, and thereafter processing for outputting hash value 24 located at a line number 650 was performed. A state of execution of application program 30 can be estimated by referring to contents shown in analysis support output 500.

At this time, data collection server 400 may output corresponding analysis support information 26 with an error caused during execution of application program 30 serving as the reference. By outputting corresponding analysis support information 26 with the caused error serving as the reference, investigation of a cause of the error can be facilitated.

A procedure in processing for determining analysis support output 500 in information processing system 1 according to the embodiment will be described with reference to FIG. 9. Each step shown in FIG. 9 is typically performed by execution of search program 314 by processor 302 of database server 300.

When database server 300 receives hash value log 116 (step S200), database server 300 performs processing for outputting, by using at least a part of hash value 24 included in hash value log 116, analysis support information 26 that makes the set with the hash value.

More specifically, database server 300 reads first hash value 24 included in received hash value log 116 (step S202). With read hash value 24 serving as a key, database server 300 extracts corresponding analysis support information 26 from hash value table 316 (step S204).

Database server 300 determines whether or not processing for all hash values 24 included in hash value log 116 has been completed (step S206). When processing for all hash values 24 included in hash value log 116 has not been completed (NO in step S206), database server 300 reads next hash value 24 included in hash value log 116 (step S208) and performs again processing in step S204 and subsequent steps.

When processing for all hash values 24 included in hash value log 116 has been completed (YES in step S206), database server 300 determines analysis support output 500 based on one or more pieces of analysis support information 26 extracted in step S204 (step S210). Then, processing for determining analysis support output 500 ends.

E. Variation of Implementation Involved with Determination of Analysis Support Output 500

In the description above, an implementation in which hash value log 116 including one or more hash values 24 output from application program 30 executed in terminal device 100 is provided to database server 300 through data collection server 400 and database server 300 determines analysis support output 500 is described. Without being limited to the implementation as described above, depending on a purpose and an application, an arbitrary implementation can be adopted.

Variation of an implementation involved with determination of analysis support output 500 in information processing system 1 according to the present embodiment will be described with reference to FIGS. 10A to 10C.

Figure 10A:
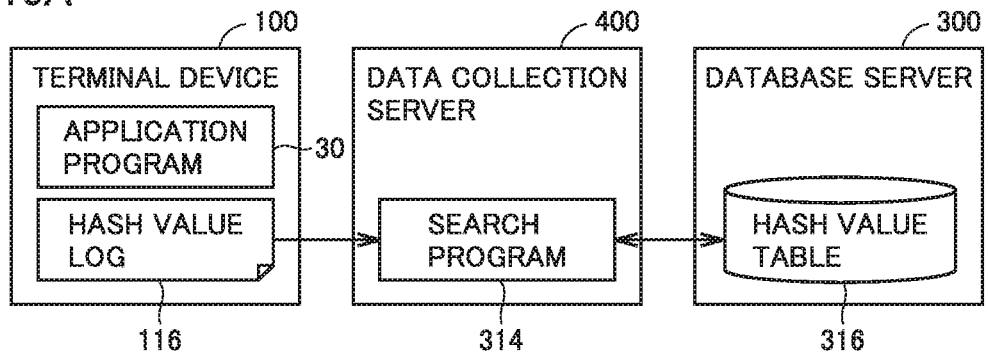
FIGS. 10A to 10C show exemplary illustrative non-limiting drawings illustrating variation of an implementation involved with determination of an analysis support output in the information processing system according to the present embodiment.

FIG. 10A shows an implementation including terminal device 100, data collection server 400, and database server 300. Specifically, hash value log 116 including one or more hash values 24 output from application program 30 executed in terminal device 100 is transmitted from terminal device 100 to data collection server 400. Data collection server 400 includes search program 314 and determines analysis support output 500 by referring to hash value table 316 in database server 300.

In the implementation shown in FIG. 10A, search program 314 and hash value table 316 are incorporated in different apparatuses. By adopting the implementation shown in FIG. 10A, a configuration in which one hash value table 316 is shared among a plurality of search programs 314 can be adopted.

Figure 10B:
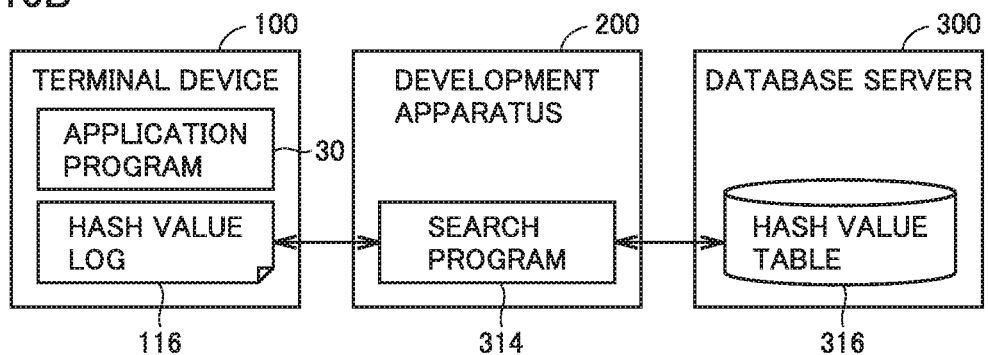

FIG. 10B shows an implementation including terminal device 100, development apparatus 200, and database server 300. Specifically, hash value log 116 including one or more hash values 24 output from application program 30 executed in terminal device 100 is collected by development apparatus 200. Development apparatus 200 includes search program 314 and determines analysis support output 500 by referring to hash value table 316 in database server 300.

In the implementation shown in FIG. 10B, development apparatus 200 can determine analysis support output 500 by referring to hash value log 116 output from application program 30 and hence feedback to a developer can quickly be given.

Figure 10C:
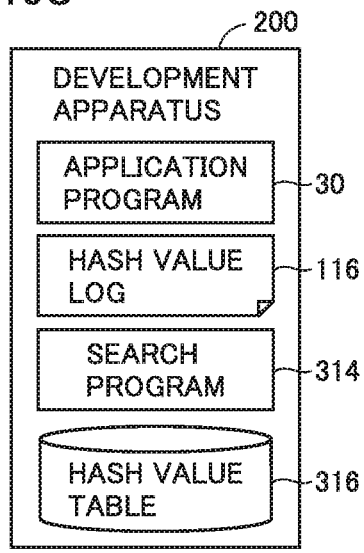

An implementation shown in FIG. 10C assumes development of application program 30 by using development apparatus 200. In development apparatus 200, application program 30 is executed and hash value log 116 including one or more hash values 24 output as a result of execution of application program 30 is also stored. Development apparatus 200 also includes search program 314 and hash value table 316, and determines as appropriate analysis support output 500 based on hash value log 116.

By adopting such an implementation, application program 30 can be developed while eliminating a bug inherent to application program 30.

Without being limited to the implementations shown in FIGS. 10A to 10C, an arbitrary implementation in accordance with a purpose or an application can be adopted.

F. Chronological Storage of Hash Values

Processing for chronologically storing hash values will now be described. Chronological storage of hash values 24 output from application program 30 is effective for investigation of a cause of an error.

An exemplary data structure of a hash value log collected in information processing system 1 according to the present embodiment will be described with reference to FIGS. 11A and 11B.

A hash value log 116A shown in FIG. 11A has a data structure in which a number 25 indicating an order of generation is associated with each of output hash values 24. By adopting the data structure shown in FIG. 11A, the order of output of hash values 24 from application program 30 can be known by referring to number 25, and estimation of a state of execution of application program 30 can be supported by this order.

A hash value log 116B shown in FIG. 11B has a data structure in which time 27 of generation is associated with each of output hash values 24. By adopting the data structure shown in FIG. 11B, the order of output of hash values 24 from application program 30 can be known by referring to time 27 of generation, and a state of execution of application program 30 can more reliably be estimated based on the order.

Without being limited to the data structures shown in FIGS. 11A and 11B, any configuration may be adopted so long as it can chronologically store hash values 24 output from application program 30 or can identify the order of generation of hash values 24 output from application program 30.

As shown in FIGS. 11A and 11B, hash values 24 output from application program 30 may successively be stored. On condition that some kind of event occurs, however, hash values 24 over a prescribed period or a prescribed number of hash values 24 may be output as hash value log 116.

As shown in FIGS. 11A and 11B, hash value log 116 may include explicit information (number 25 and time 27 of generation) that identifies the order of hash values 24 output as a result of execution of application program 30. So long as hash values 24 output as a result of execution of application program 30 are stored successively in hash value log 116, the order of storage itself means the order of generation, and hence explicit information that identifies the order does not have to be given.

An exemplary hash value log collected as being triggered by occurrence of an error in information processing system 1 according to the present embodiment will be described with reference to FIG. 12. When some kind of error is caused in application program 30, among hash values 24 successively output from application program 30, hash values 24 over a prescribed period with occurrence of the error serving as the reference or a prescribed number of hash values 24 with occurrence of the error serving as the reference may be output as hash value log 116.

Figure 12:
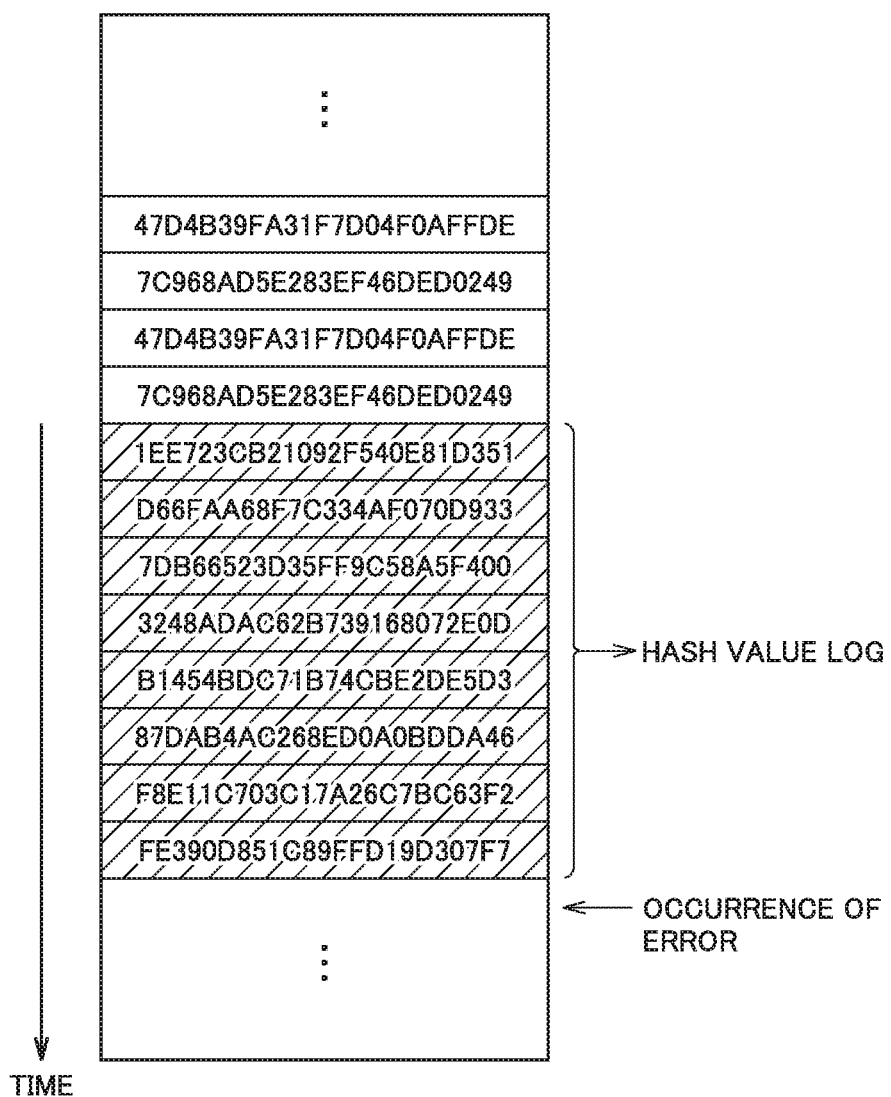
FIG. 12 shows an exemplary illustrative non-limiting drawing illustrating a hash value log collected as being triggered by occurrence of an error in the information processing system according to the present embodiment.

As shown in FIG. 12, by limiting hash value 24 to be included in hash value log 116 in association with occurrence of an arbitrary event such as an error, analysis support output 500 consisting of analysis support information 26 necessary for investigation of a cause of some kind of error caused in application program 30 can be determined. In this case, in analysis support output 500, corresponding analysis support information is output with an error caused during execution of application program 30 serving as the reference.

Thus, when an error is caused during execution of application program 30, terminal device 100 may hold a prescribed number of hash values associated with timing of occurrence of the error and pass the hash values to data collection server 400 or database server 300.

Instead of the configuration as shown in FIG. 12, terminal device 100 may chronologically store hash values 24 output as a result of execution of application program 30 without being dependent on whether or not an error is caused during execution of application program 30.

G. Other Embodiments

Though an example in which hash output instruction 12 including hash value calculation instruction 13 is arranged at an arbitrary position in source code 10 is shown, a function that refers to a plurality of hash values prepared in advance under a predetermined rule or randomly may be used instead of hash value calculation instruction 13 for dynamic calculation of a hash value.

Alternatively, pseudo source code 20 in which hash value 24 calculated based on hash value calculation instruction 13 is explicitly embedded may be generated and application program 30 may be generated from generated pseudo source code 20. Furthermore, for processing for compiling source code 10 and/or pseudo source code 20 as well, any implementation may be adopted.

Though an example in which hash output instruction 12 including hash value calculation instruction 13 is arranged at an arbitrary position in source code 10 is shown, a function that refers to a plurality of hash values prepared in advance under a predetermined rule or randomly may be used instead of hash value calculation instruction 13 for calculation of a hash value by computation during compilation.

Pseudo source code 20 in which hash value 24 calculated based on hash value calculation instruction 13 is explicitly embedded may be generated and application program 30 may be generated from generated pseudo source code 20.

Furthermore, for processing for compiling source code 10 and/or pseudo source code 20 as well, any implementation may be adopted.

H. Advantages

According to the present embodiment, by incorporating hash value calculation instruction 13 into source code 10 of application program 30, hash values 24 are successively output as application program 30 is executed. By preparing hash value table 316 including a set of analysis support information 26 associated with hash value calculation instruction 13 and hash value 24, the meaning of hash values 24 successively output from application program 30 can be obtained.

Adoption of such a configuration is advantageous from a point of view of performance, security, and usability.

Regarding performance, since hash value 24 output as a result of execution of application program 30 has a predetermined number of digits, a state of execution of application program 30 can be estimated with a small data size. Therefore, consumption of a resource can also be low. Since the data size of hash value 24 is fixed, a resource necessary for outputting hash value 24 can be estimated in advance and hardware design or the like can be cost efficient.

Regarding security, since hash value 24 itself output from application program 30 does not make any sense, hash value 24 does not include any information for reverse engineering or the like of application program 30. Only output hash value 24 is embedded also in distributed application program 30, and there is no possibility of leakage of unnecessary information.

Regarding usability, a developer should only insert hash output instruction 12 and hash value calculation instruction 13 into a necessary position in source code 10, without paying attention to output hash value 24 or the like. Then, during compilation, a set of analysis support information 26 generated by content analysis of source code 10 and hash value 24 is automatically determined as hash value table 316. Thus, as the developer simply performs an operation as conventionally without paying particular attention, the developer can perform an analysis support function by using a hash value according to the present embodiment.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system comprising one or more processors configured to:
    generate a program so as to output a hash value calculated based on a hash value calculation instruction included in a source code for generating the program, wherein the hash value calculation instruction is executed and analyzed when compiling the source code;
    determine a set of analysis support information associated with the hash value calculation instruction and the hash value calculated based on the hash value calculation instruction for analyzing the program;
    store the set of the analysis support information and the hash value;
    store at least a part of one or more hash values output as a result of execution of the program; and
    output, by using at least the part of the stored hash value, the analysis support information that makes the set with the hash value.

2. The information processing system according to claim 1, further configured to generate the program so as to output the calculated hash value at a position corresponding to the hash value calculation instruction.

3. The information processing system according to claim 1, further configured to output corresponding analysis support information with an error caused during execution of the program serving as a reference.

4. The information processing system according to claim 1, further configured to regard the hash value calculation instruction included in the source code as an instruction to arrange a corresponding hash value.

5. The information processing system according to claim 1, wherein
    the analysis support information includes information that identifies a source code where a corresponding hash value calculation instruction has been included and information that identifies a position where the corresponding hash value calculation instruction has been included.

6. The information processing system according to claim 1, wherein
    the analysis support information includes information on revision of a source code where a corresponding hash value calculation instruction has been included.

7. The information processing system according to claim 1, further configured to further store information that identifies an order of hash values output as a result of execution of the program.

8. The information processing system according to claim 1, further configured to chronologically store hash values output as a result of execution of the program, without depending on whether an error is caused during execution of the program.

9. The information processing system according to claim 1, further configured to hold, when an error is caused during execution of the program, hash values over a prescribed period associated with timing of occurrence of the error or a prescribed number of hash values associated with timing of occurrence of the error.

10. An information processing method comprising:
    generating a program so as to output a hash value calculated based on a hash value calculation instruction included in a source code for generating the program, wherein the hash value calculation instruction is executed and analyzed when compiling the source code;
    determining a set of analysis support information associated with the hash value calculation instruction and the hash value calculated based on the hash value calculation instruction for analyzing the program;
    storing the set of the analysis support information and the hash value;
    storing at least a part of one or more hash values output as a result of execution of the program; and
    outputting, by using at least the part of the stored hash value, the analysis support information that makes the set with the hash value.

11. An information processing system comprising one or more processors configured to:
    generate a program so as to output a hash value calculated based on a hash value calculation instruction included in a source code for generating the program, wherein the hash value calculation instruction is executed and analyzed when compiling the source code;

determine a set of analysis support information associated with the hash value calculation instruction and the hash value calculated based on the hash value calculation instruction for analyzing the program;

store the set of the analysis support information and the hash value; and output, by using at least a part of one or more hash values output as a result of execution of the program, the analysis support information that makes the set with the hash value.

12. A development apparatus comprising one or more processors configured to:

generate a program so as to output a hash value calculated based on a hash value calculation instruction included in a source code for generating the program, wherein the hash value calculation instruction is executed and analyzed when compiling the source code;

determine a set of analysis support information associated with the hash value calculation instruction and the hash value calculated based on the hash value calculation instruction for analyzing the program;

store the set of the analysis support information and the hash value; and store at least a part of one or more hash values output as a result of execution of the program.

* * * * *